United States Patent [19]
Wu

[11] Patent Number: 6,099,353
[45] Date of Patent: Aug. 8, 2000

[54] IC CARD CONNECTOR

[75] Inventor: Kun-Tsan Wu, Tu-Chen, Taiwan

[73] Assignee: Hon Hai Precision Ind. Co., Ltd., Taipei Hsien, Taiwan

[21] Appl. No.: 09/322,906

[22] Filed: Jun. 1, 1999

[30] Foreign Application Priority Data

Jun. 2, 1998 [TW] Taiwan ................................. 87208644

[51] Int. Cl.⁷ .................................................. H01R 23/70
[52] U.S. Cl. ............................................................ 439/630
[58] Field of Search ..................................... 439/607, 630

[56] References Cited

U.S. PATENT DOCUMENTS

| | | | |
|---|---|---|---|
| 4,900,272 | 2/1990 | Lange et al. | 439/630 |
| 5,013,255 | 5/1991 | Juret et al. | 439/260 |
| 5,231,274 | 7/1993 | Reynier et al. | 235/441 |
| 5,259,777 | 11/1993 | Schuder et al. | 439/188 |
| 5,823,828 | 10/1998 | Bricaud et al. | 439/630 |
| 6,004,155 | 12/1999 | Wu | 439/489 |
| 6,039,599 | 3/2000 | Benjamin et al. | 439/489 |

*Primary Examiner*—Brian Sircus
*Assistant Examiner*—Thanh-Tam Le
*Attorney, Agent, or Firm*—Wei Te Chung

[57] ABSTRACT

An IC card connector comprises an insulative housing defining a number of terminals receiving passageways therein, a number of terminals received in the passageways, a shielding cover and a support plate. A number of fixing posts and a number of mounting portions projects from a bottom surface of the housing. The support plate defines a number of mounting openings and mounting apertures therethrough. The support portion is attached to the bottom surface of the housing and the fixing posts and the projections of the housing extend through the mounting holes and the mounting apertures of the support plate, respectively. Processed by an ultrasonic fusing method, the posts and the apertures of the support plate become molten and bond the support plate to the housing thereby securing the terminals within the passageways of the housing.

15 Claims, 7 Drawing Sheets

IC CARD CONNECTOR

BACKGROUND OF THE INVENTION

The present invention generally relates to an IC (Integrated Circuit) card connector, and particularly to a compact IC card connector that can reliably engage an inserted IC card.

IC card connectors are popularly used in computers to provide electrical connection between a circuit board and an IC card, whereby the IC card can in put/output information from/to a central processing unit on the circuit board.

A related IC card connector disclosed in U.S. Pat. No. 5,013,255 has an insulative housing and a plurality of terminal passageways defined therein for accommodating conductive terminals. These terminals are fixed to the housing by having fitting portions of the terminals interferentially engaging with partitions of the housing defining the terminal passageways. To ensure a sufficient engagement between the fitting portions of the terminals and the partitions, the partitions should have a large thickness, which in turn results in a large size of a housing of the connector. A large size connector is not favorable in view of an efficient use of the space within a computer.

SUMMARY OF THE INVENTION

Accordingly, a first purpose of the present invention is to provide an IC card connector having a compact insulative housing which can reliably retain terminals therein.

A second purpose of the present invention is to provide an IC card connector which is easily and reliably assembled.

A third purpose of the present invention is to provide an IC card connector which can be effectively shielded against exterior EMI (Electromagnetic Interference).

To fulfill the above-mentioned purposes, an IC card connector in accordance with the present invention comprises an insulative housing defining a plurality of terminal receiving passageways therein, a plurality of terminals received in the passageways, a shielding cover and a support plate. A plurality of fixing posts and a mounting portion project from a bottom surface of the housing. The support plate defines a plurality of mounting openings and mounting apertures therethrough corresponding to the fixing posts and mounting portions of the housing. The support plate is attached to the bottom surface of the housing to cause the fixing posts which has extended through the corresponding terminals and the projections of the housing to extend through the mounting holes and the mounting apertures of the support plate, respectively. Processed by an ultrasonic fusing method, the posts and the portions become molten and bond the support plate to the housing thereby securing the terminals within the passageways of the housing.

The shielding cover is mounted to a top surface of the housing. A plurality of inward embossed ribs is formed in the shielding cover for preventing an inserted IC card from distortion, urging the inserted IC card to effectively contact the contact portion of the terminals and strengthening the cover.

DETAILED DESCRIPTION OF THE PREFERED EMBODIMENT

Figure 1:
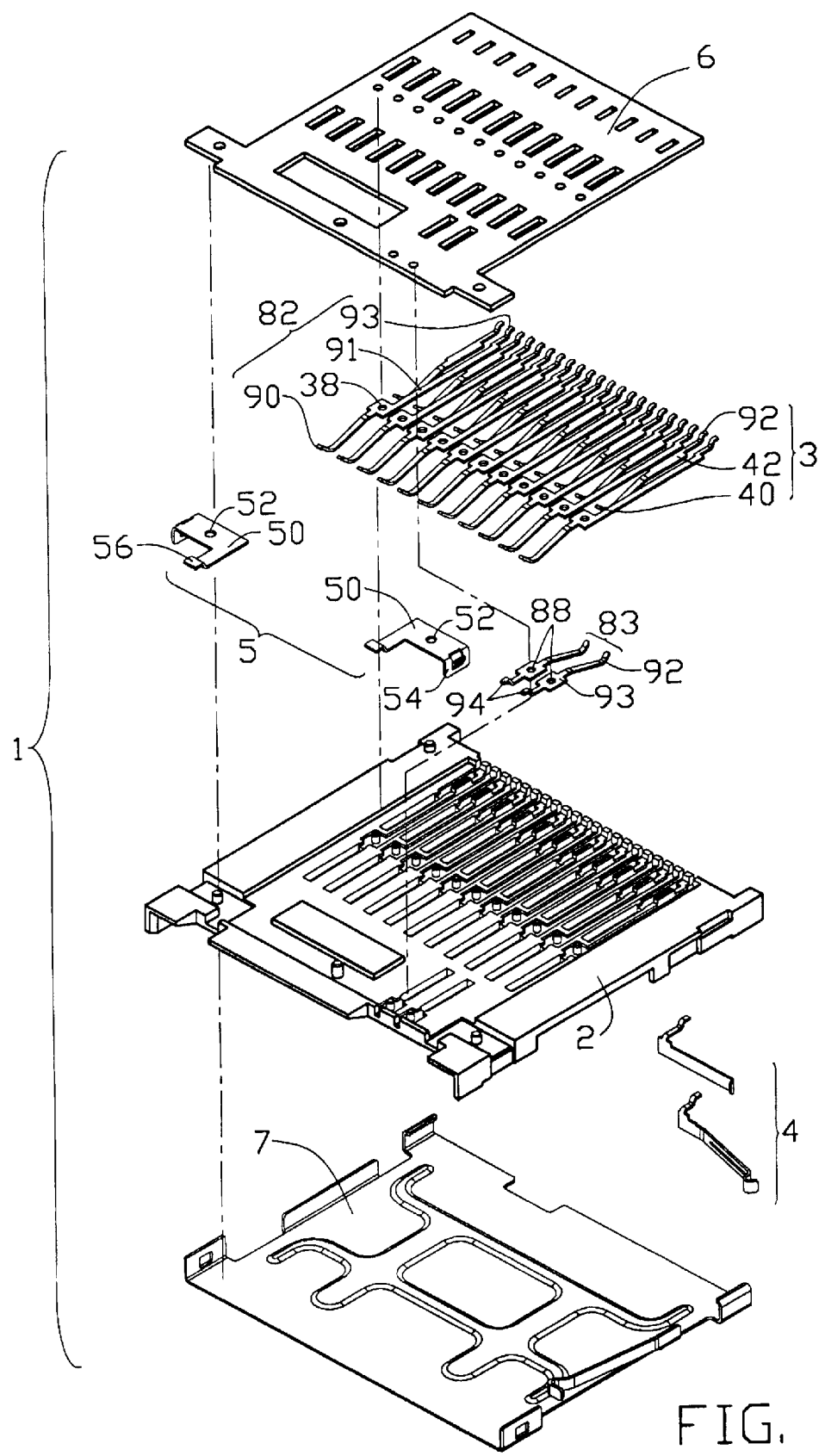
FIG. 1 is an exploded view of an IC card connector in accordance with the present invention.
Figure 2:
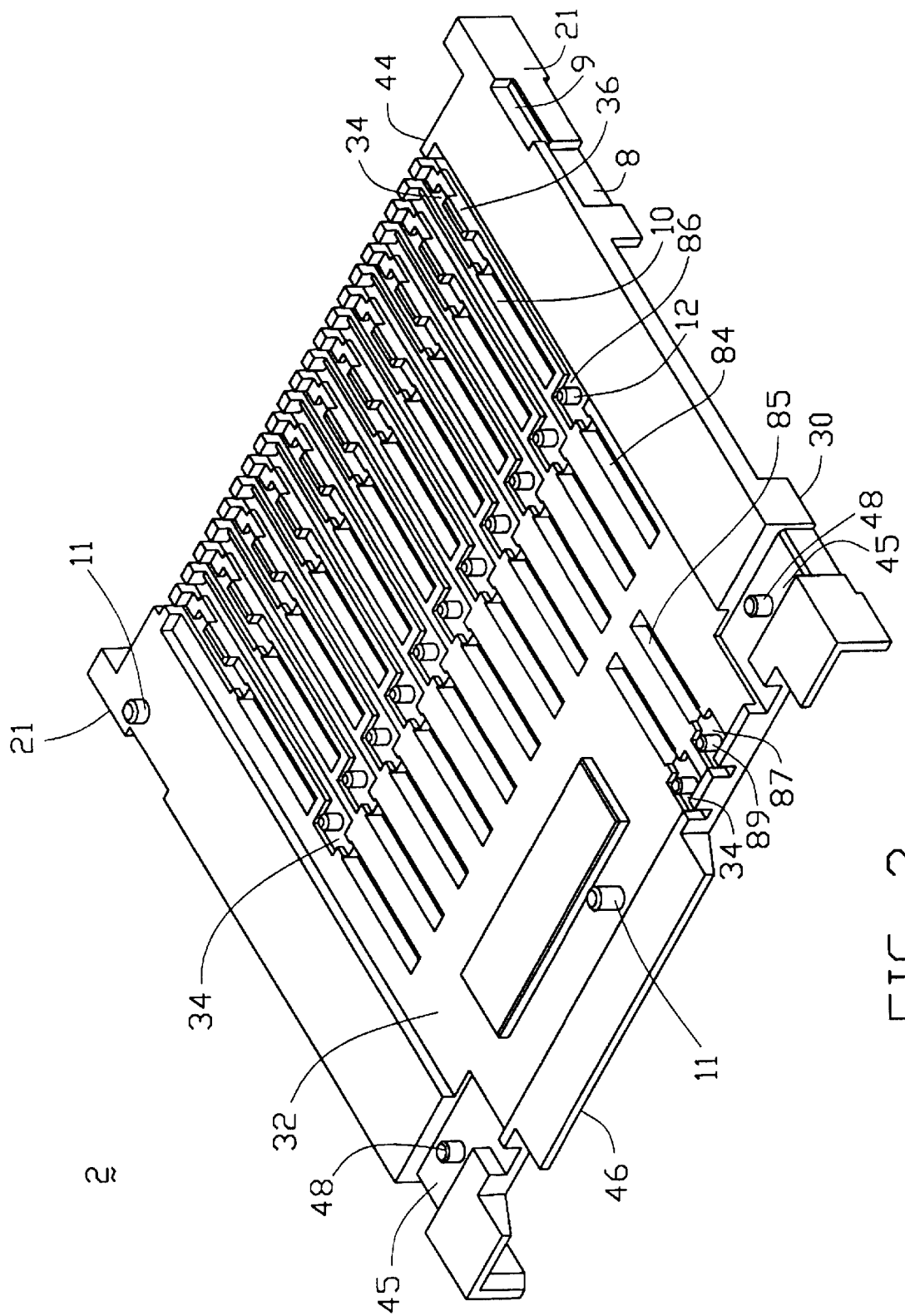
FIG. 2 is a perspective view of an insulative housing of the IC card connector of the present invention.

Referring to FIGS. 1 and 2, an IC card connector I in accordance with the present invention comprises an insulative housing 2, a plurality of first terminals 3, second terminals 82 and third terminals 83, a support plate 6, a shielding cover 7 and a pair of switch contact 4. The housing 2 defines first passageways 10, second passageways 84 and third passageways 85 between a top surface 30 (FIG. 5) and a bottom surface 32 thereof. It should be understood that the designation of "top" surface 30 and "bottom" surface 32 is made with respect to a common view of the housing 2 such as illustrated in FIG. 5. However, since the features of the present invention focus on the bottom surface 32, the bottom surface 32 is upwardly exposed for convenient description such as illustrated in FIGS. 1, 2, 4 and 7.

A first support recess 34, a second support recess 86 and a third support recess 87 are defined proximate each first passageway 10, second passageway 84 and third passageway 85, respectively. A mounting portion 36 projects from each first support recess 34. A rear fixing post 12 and a front fixing post 89 project from each second support recess 86 and third support recess 87, respectively. A pair of orienting posts 11 projects from the bottom surface 32 of the housing 2 for insertion into corresponding apertures of a circuit board (not shown) for guiding the connector 1 to be correctly mounted to the circuit board.

Figure 4:
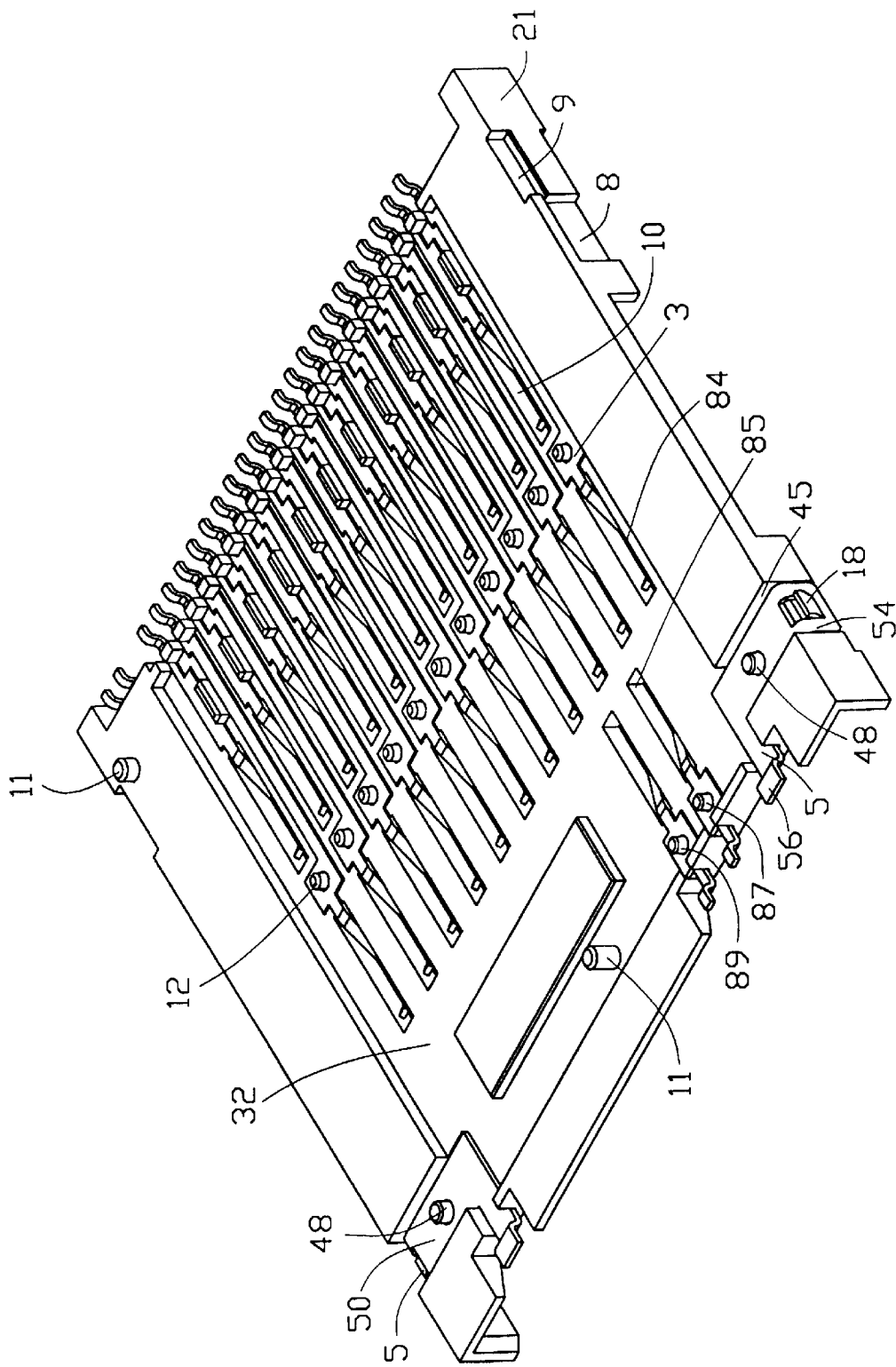
FIG. 4 is an assembled view of the IC card connector with the shielding cover omitted.
Figure 5:
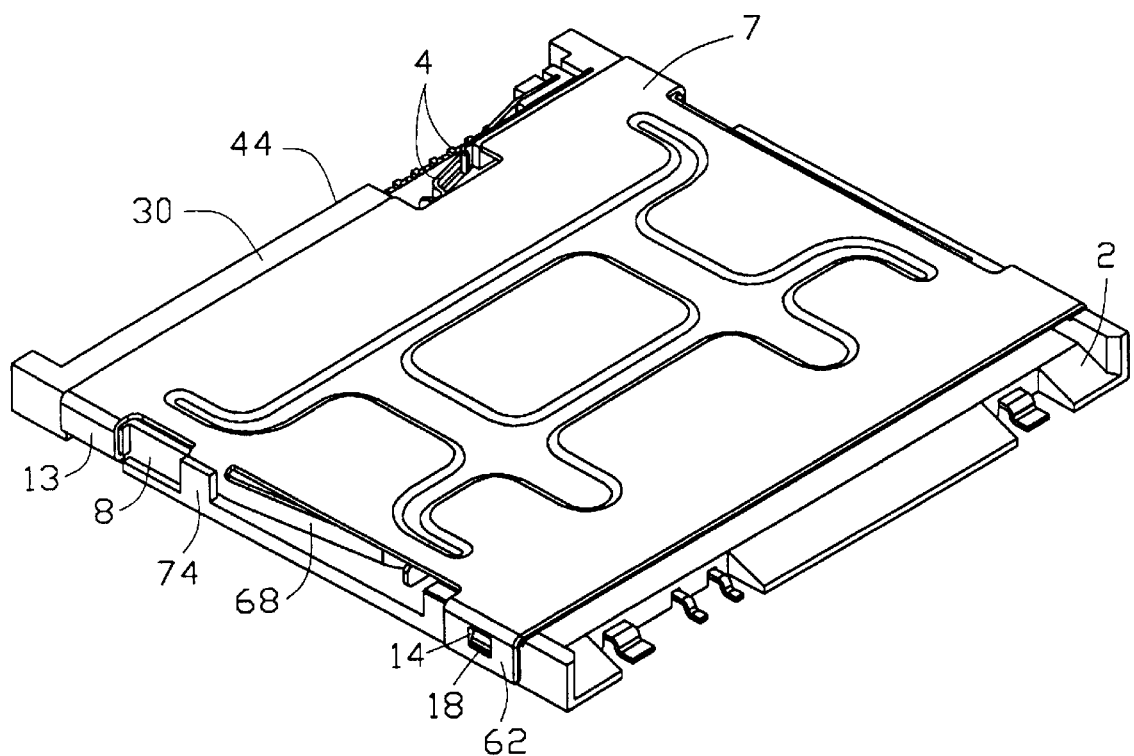
FIG. 5 is an assembled view of FIG. 1.

Also referring to FIG. 4, the first terminals 3 the second terminals 82 and the third terminals 93 are received in the first passageways 10 and the second passageways 84 and the third terminal passageways 85. These terminals 3, 82 and 83 are used for signal transmission. The second terminals 82 each define an opening 38 therein whereby the rear post 12 of the housing 2 extend therethrough. The third terminals 83 each define a hole 88 therein whereby the front post 89 of the housing 2 extend therethrough. Each first terminal 3 includes a first curved contact portion 40 received in the first passageway 10, a first mounting portion 42 received in the first support portion 34 and a first solder portion 92 for being soldered to a circuit board (not shown). Each second terminal 82 includes a second curved contact portion 90 received in the second passageway 84, a second mounting portion 91 received in the second support portion 86 and a second solder portion 93 for being soldered to the circuit board. Each third terminal 83 includes a third curved contact portion 92 received in the third passageway 85, a third mounting portion 93 received in the third support recess 87 and a third solder portion 94 for being soldered to the circuit board. The first contact portion 40, the second contact portion 90 and the third contact portion 92 of the first terminal 3, the second terminal 82 and the third terminal 83 project beyond the top surface 30 of the housing 2 for contacting corresponding portions of an inserted IC card (not shown). The first passageways 10, second passageways 84 and the third passageways 85 of the housing 2 each provide sufficient clearance for allowing proper movement of the first contact portion 40, the second contact portion 91 and the third contact portion 92 of the first terminal 3, the second terminals 82 and the third terminals 83. A pair of switch contacts 4 is mounted to the top surface 30 of the housing 2 proximate a rear edge 44 thereof (FIG. 5) for detecting full insertion of the IC card.

Referring to FIG. 2 gain, a pair of positioning recesses 45 is defined in the bottom surface 32 of the housing 2 proximate a front edge 46 and side surfaces 21 thereof. A fixing post 48 projects from each positioning recess 45. A pair of metal grounding members 5 (FIGS. 1 and 4) each include a body portion 50 with an opening 52 defined therein and an upwardly bent side wall 54 with an outwardly stamped tab 18. Each grounding member 50 has a soldering end 56 for being soldered to corresponding circuits on the circuit board thereby providing grounding capabilities. The body portion 50 of the grounding member 5 is received in the positioning recess 45 with the fixing post 48 extending through the opening 52 thereof. A retaining recess 8 as shown in FIGS. 2 and 4 is defined in each side surface 21 of the housing 2 proximate the front edge 44 thereof. A groove 9 is defined in each side surface 21 between the corresponding retaining recess 8 and the front edge 44.

Figure 6:
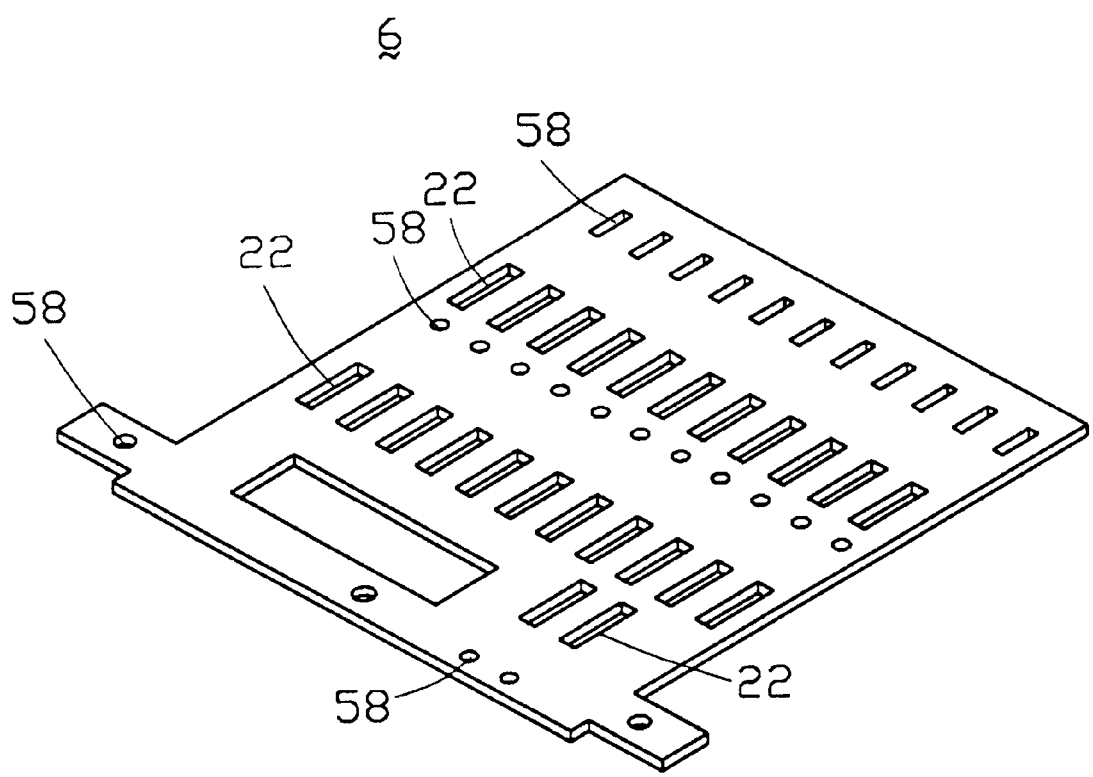
FIG. 6 is a perspective view of a support plate of the IC card connector of the present invention.
Figure 7:
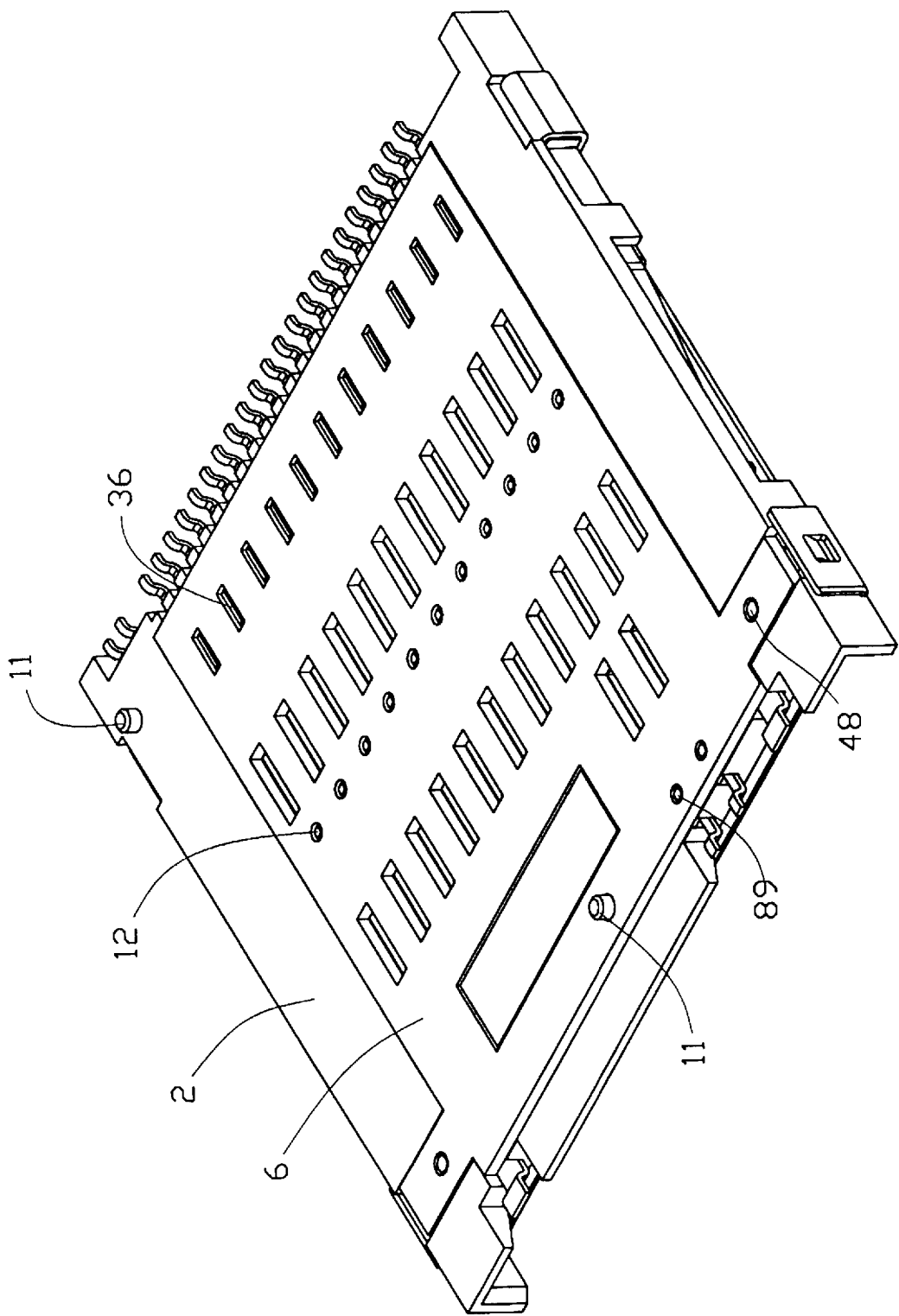
FIG. 7 is similar to FIG. 5 but taken from a different perspective.

Referring to FIGS. 6 and 7, the support plate 6 defines a plurality of openings 58 to allow the fixing posts 12, 89, 48 and the mounting portions 36 to extend through. The support plate 6 defines three rows of apertures 22 corresponding to the passageways 10, 84, 85 of the housing 2 and providing the contact portions 40, 90, 92 of the terminals 3, 82, 83 with sufficient clearance for allowing proper movement. Processed by an ultrasonic fusing method, the fixing posts 12, 89 48 and the mounting portions 36 become molten to bond the support plate 6 to the bottom surface 32 of the housing 2. Such a method can be processed by automatic mechanisms thereby facilitating assembly. It is noted that the terminals 3, 82, 83 are not interferentially fit in the passageways 10, 84, 85 thereby decreasing the likelihood of large thickness of partitions (not labeled) of the housing 2 for defining the terminal passageways 10, 84, 85. Thus, the housing 2 can be manufactured with a minimum size.

Figure 3:
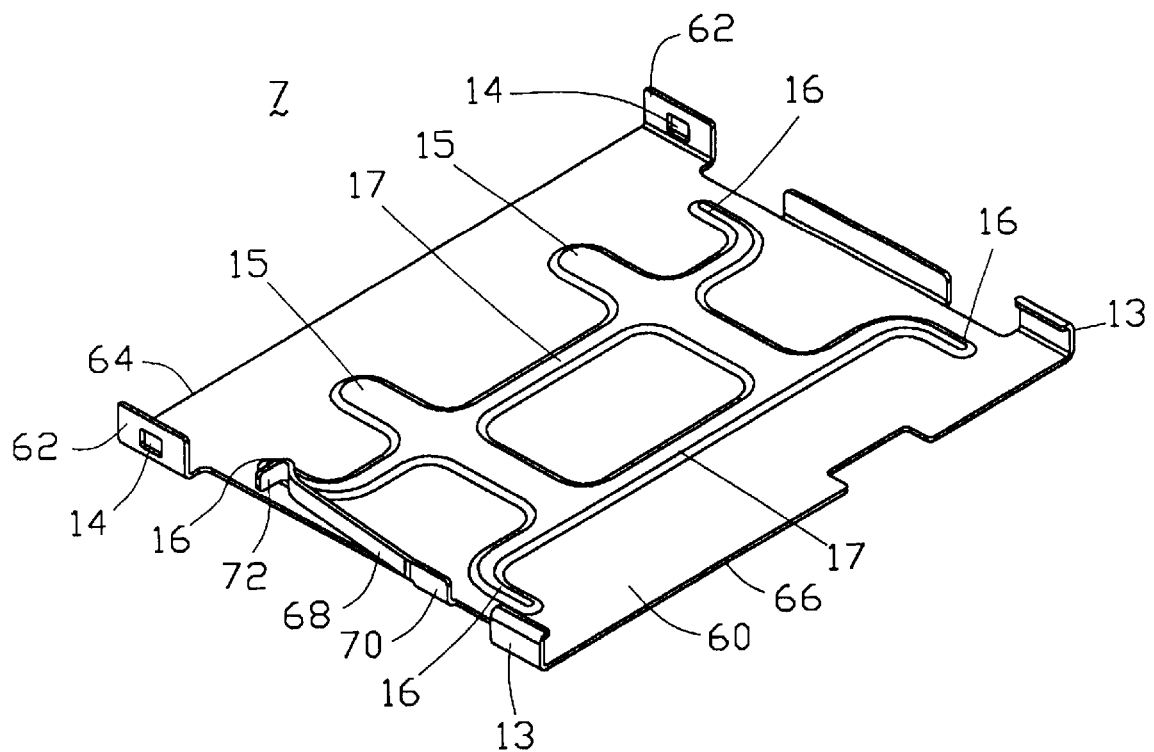
FIG. 3 is a perspective view of a shielding cover of the IC card connector of the present invention.

Referring to FIGS. 3 and 5, the shielding cover 7 adapted to cover the top surface 30 of the housing 2 is made of metal for shielding the IC card connector 1 against exterior EMI (Electromagnetic Interference). The cover 7 has a body portion 60 forming a plurality of inwardly embossed ribs 15, 16, 17 thereon. The ribs 16 are adapted to prevent an inserted IC card from distortion. Furthermore, the ribs 15, 17 are adapted to urge the inserted IC card to effectively contact the contact portion 40 of the terminals 3. The ribs 15, 16, 17 are also adapted to strengthen the cover 7. A pair of securing walls 62 is downwardly bent from a second side edge of the cover 7 proximate a front edge 64 thereof with a window 14 defined therein. A pair of L-shaped walls 13 downwardly extends from a first side edge of the cover 7 proximate a rear edge 66 thereof. The cover 7 has an integral securing arm 68 including a fixing end 70 connected to a side edge of the cover 7 and a free end 72 for fixing grounding an inserted IC card by inwardly urging a side thereof. The free end 72 may has a surface which is parallel to a lead edge of the inserted IC card for engaging the IC card. A leading corner of the IC card adapted to engage the securing arm of the shielding cover forms a diagonal notch for outwardly pushing the securing arm. If another leading corner which does not form a diagonal notch engages the securing arm of the shielding, the leading edge of the IC card would be stopped by the parallel surface of the free end thereby preventing disorientation of the inserted IC card from occurring. In assembly, the L-shaped walls 13 of the cover are positioned in the retaining recesses 8 of the housing 2 and end portions thereof are received in the grooves 9 thereby securing the L-shaped walls 13 in the grooves 9. The securing arm 68 is retained by a support wall 74 of the housing 2. The windows 14 of the securing walls 62 of the cover 7 are engaged with the tabs 18 of the grounding members 5 thereby electrically connecting the cover 7 and the grounding members 5 together and effectively grounding the shielding cover 7.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

I claim:

1. An IC card connector for providing electrical connection between an IC card and a circuit board, comprising:

an insulative housing defining a plurality of terminal receiving passageways between a bottom surface and a top surface thereof, a plurality of fixing posts and a plurality of mounting portions projecting from the bottom surface;

a plurality of terminals secured within the passageways of the housing each having a contact portion received in the passageways;

a support plate mounted to the bottom surface of the housing defining a plurality of mounting holes and a plurality of mounting apertures therethrough for receiving the fixing posts and the mounting portions of the housing, respectively; and a shielding cover attached to the top surface of the housing.

2. The IC card connector as claimed in claim 1, wherein the shielding cover has a plurality of inwardly embossed ribs for smoothly guiding the inserted IC card and for strengthening the cover.

3. The IC card connector as claimed in claim 2, wherein a securing wall downwardly extends from a second side edge of the shielding cover with a window defined therein and a grounding member is mounted to one side of the housing, the grounding member having an outwardly stamped tab for engaging in the window of the shielding cover and a solder end adapted to be soldered to the circuit board.

4. The IC card connector as claimed in claim 1, wherein the shielding cover comprises an integral securing arm having a forward free end.

5. The IC card connector as claimed in claim 4, wherein the securing arm extends from a side edge thereof for biasing and grounding an inserted IC card.

6. The IC card connector as claimed in claim 4, wherein the free end of the securing arm is outwardly displaceable by a diagonally-notched leading corner of the inserted IC card.

7. The IC card connector as claimed in claim 6, wherein the free end of the securing arm is substantially parallel to a lead edge of the diagonally notched IC card for engaging the IC card, and wherein the securing arm of the shielding cover is adapted to engage the diagonal notch formed at the leading corner of the IC card.

8. The IC card connector as claimed in claim 1, wherein a pair of L-shaped walls downwardly extends from a first side edge of the shielding cover for engaging with the housing.

9. The IC card connector as claimed in claim 8, wherein a retaining recess is defined in a side of the housing and a groove is defined proximate the retaining recess for cooperatively fixing the L-shaped wall of the shielding cover.

10. The IC card connector as claimed in claim 1, wherein each terminal defines an opening therein for extension of the corresponding fixing post therethrough.

11. The IC card connector as claimed in claim 1, wherein a support recess is defined in the housing proximate each passageway, and each terminal has a support portion received in the support recess.

12. The IC card connector as claimed in claim 11, wherein the support plate defines a plurality of apertures corresponding to the passageways of the housing for providing sufficient clearance to allow a movement of the contact portions of the terminals.

13. The IC card connector as claimed in claim 1, wherein a pair of orienting posts projects from the bottom surface of the housing for guidingly inserting into corresponding apertures of the circuit board.

14. An IC card connector for providing electrical connection between an IC card and a circuit board, comprising:

an insulative housing defining a plurality of terminal receiving passageways between a bottom surface and a top surface thereof, a plurality of fixing posts and a plurality of mounting portions projecting from the bottom surface;

a support plate mounted to the bottom surface of the housing defining a plurality of mounting holes and a plurality of mounting apertures therethrough for receivably securing to the fixing posts and the mounting portions of the housing, respectively, through an ultrasonic fusing method wherein the fixing posts and the mounting portions become molten to bond the support plate to the bottom surface of the housing; and a plurality of terminals respectively received within the housing, each of said terminals including a contact portion received within the corresponding passageway for engagement with the IC card and a mounting portion for receivable engagement within a support recess defined in the housing adjacent to said corresponding passageway; whereby each of said terminals is sandwiched between the support plate and the housing by means of the mounting portion of each of said terminals being engaged within the corresponding support recess so as to avoid interferential type securement between the terminal and the housing.

15. An IC card connector for providing electrical connection between an IC card and a circuit board, comprising:

an insulative housing defining a plurality of terminal receiving passageways between a bottom surface and a top surface thereof, a plurality of terminals secured within the corresponding passageways of the housing, respectively;

a support plate mounted to the bottom surface of the housing;

a shielding cover attached to the top surface of the housing; and at least a grounding member received within a positioning recess in the housing and retained thereto by the support plate, said grounding member including means for securing the shielding cover to the housing.

* * * * *